United States Patent [19]
Perkins et al.

[11] Patent Number: 5,454,045
[45] Date of Patent: Sep. 26, 1995

[54] APPARATUS AND METHOD FOR IDENTIFICATION AND RECOGNITION OF AN ITEM WITH ULTRASONIC PATTERNS FROM ITEM SUBSURFACE MICRO-FEATURES

[75] Inventors: Richard W. Perkins; James L. Fuller; Steven R. Doctor; Morris S. Good; Patrick G. Heasler, all of Richland; James R. Skorpik; Norman H. Hansen, both of Kennewick, all of Wash.

[73] Assignee: Battelle Memorial Institute, Richland, Wash.

[21] Appl. No.: 228,477

[22] Filed: Apr. 15, 1994

[51] Int. Cl.$^6$ .................................................. G06K 9/00
[52] U.S. Cl. .................................. 382/181; 382/218; 73/606
[58] Field of Search .................................. 382/2, 6, 10, 30, 382/34; 364/413.25; 128/660.01, 660.07; 73/606; 367/11, 40, 41, 42, 124, 125, 126

[56] References Cited

U.S. PATENT DOCUMENTS

| | | | |
|---|---|---|---|
| 4,690,554 | 9/1987 | Froelich | 356/71 |
| 4,977,601 | 12/1990 | Bicz | 382/4 |
| 4,988,189 | 1/1991 | Kroupa et al. | 356/4 |
| 5,121,444 | 6/1992 | Takizawa et al. | 382/30 |
| 5,140,988 | 8/1992 | Stouffer et al. | 128/660.01 |
| 5,184,622 | 2/1993 | Tomura | 128/660.07 |
| 5,258,922 | 11/1993 | Grill | 364/506 |

OTHER PUBLICATIONS

Ultrasonic Time Variable Gain Interface (TVGI), Battelle, Feb. 1991, (brochure).

Primary Examiner—Leo H. Boudreau
Assistant Examiner—Andrew W. Johns
Attorney, Agent, or Firm—Paul W. Zimmerman

[57] ABSTRACT

The present invention is a means and method for identification and recognition of an item by ultrasonic imaging of material microfeatures and/or macrofeatures within the bulk volume of a material. The invention is based upon ultrasonic interrogation and imaging of material microfeatures within the body of material by accepting only reflected ultrasonic energy from a preselected plane or volume within the material. An initial interrogation produces an identification reference. Subsequent new scans are statistically compared to the identification reference for making a match/non-match decision.

16 Claims, 11 Drawing Sheets

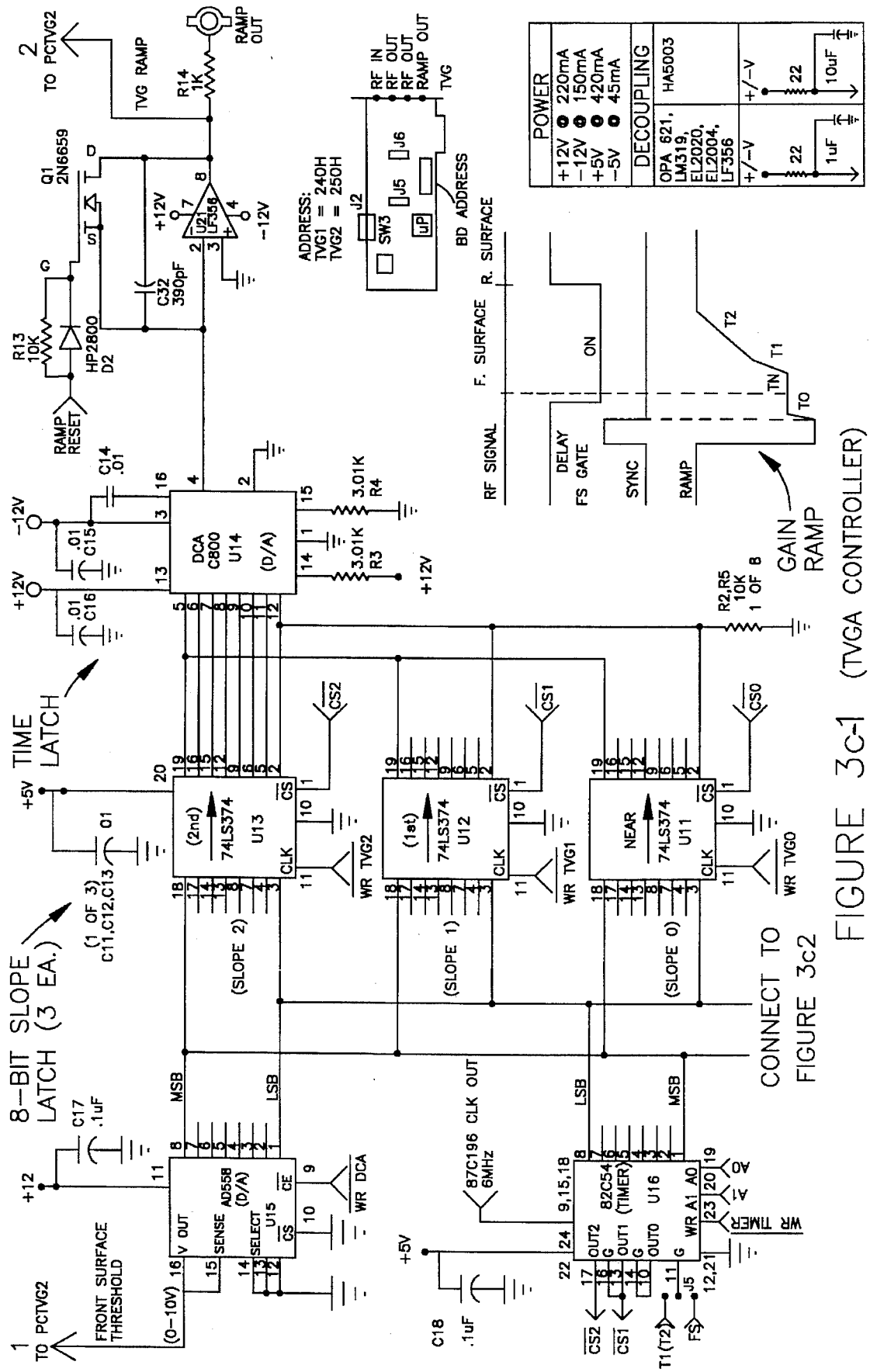
FIGURE 3c-1 (TVGA CONTROLLER)

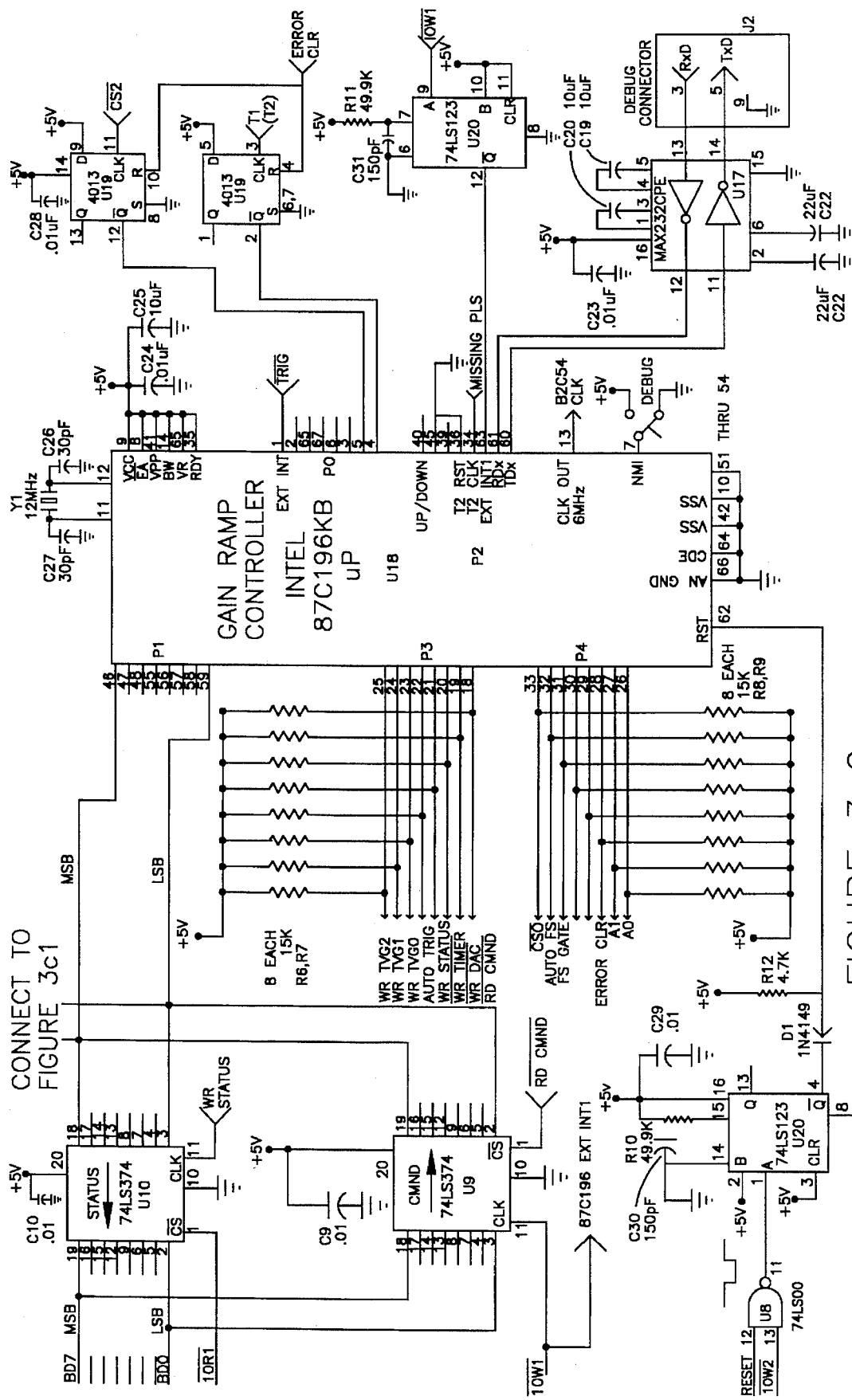
FIGURE 3c-2 (TVGA CONTROLLER)

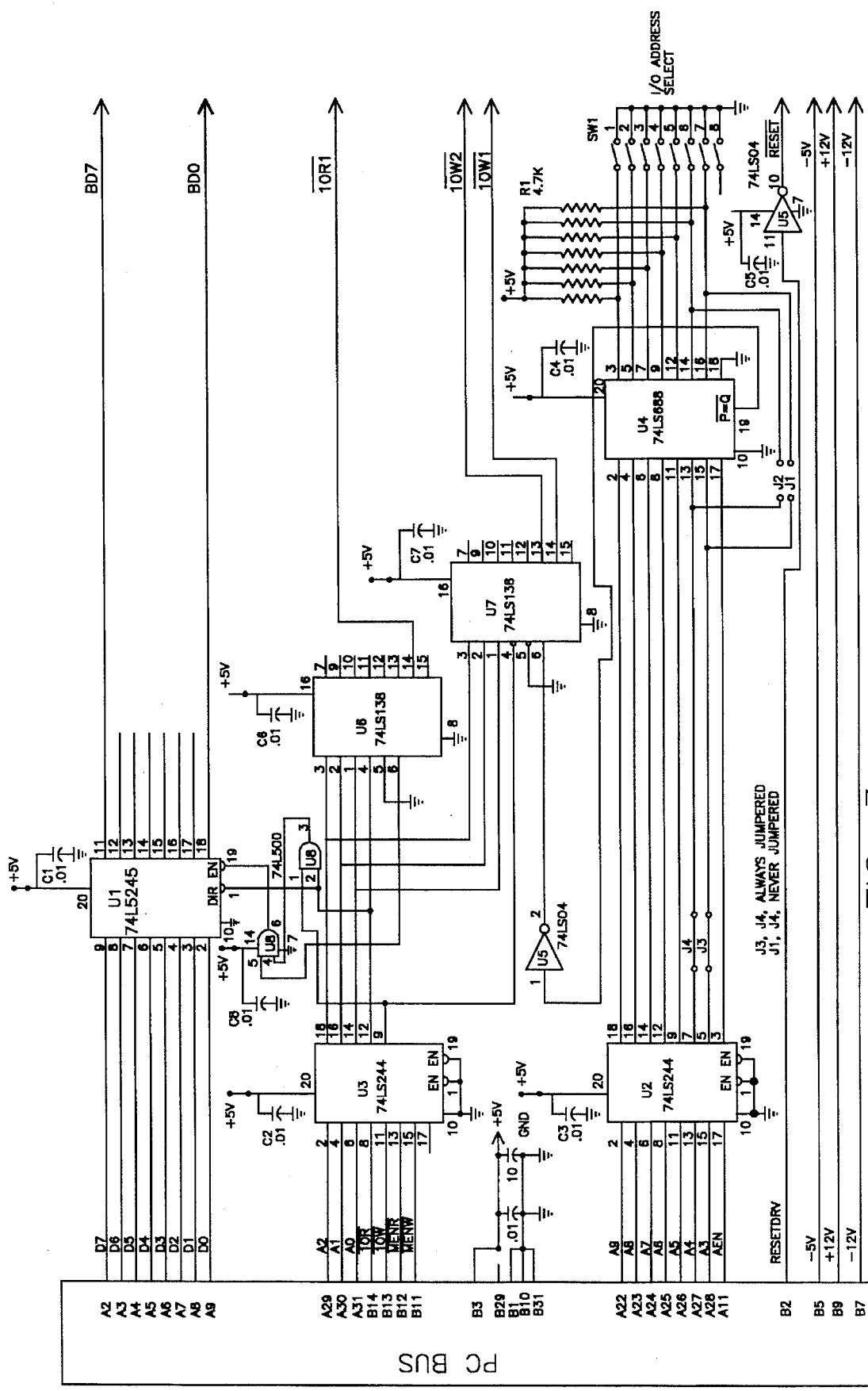
FIG. 3e (COMPUTER INTERFACE)

APPARATUS AND METHOD FOR IDENTIFICATION AND RECOGNITION OF AN ITEM WITH ULTRASONIC PATTERNS FROM ITEM SUBSURFACE MICRO-FEATURES

This invention was made with Government support under Contract DE-AC06-76RLO 1830 awarded by the U.S. Department of Energy. The Government has certain rights in the invention.

FIELD OF THE INVENTION

The present invention relates generally to a means and method for obtaining ultrasonic images related to material subsurface micro-features. More specifically, the images are a superposition or interference pattern of multiple ultrasonic signals reflected from subsurface micro-features as distinguished from direct images of the actual subsurface micro-features. Although actual subsurface micro-features are not imaged, the interference images are unique for a unique position within a material sample and can therefore be used in identification and recognition of an item.

BACKGROUND OF THE INVENTION

Identification and recognition of items is of importance for security and forensic purposes. It is also important for inventory and registration of items. Means for identification and recognition, generally referred to as tags, range from marks embedded in a surface of a part, for example engine block identification number, to affixing a separate label, for example a gummed label, a metal imprinted tag, or a plastic tethered tag. More sophisticated tags include laser tagging of precious stones wherein a laser is used to alter a minute portion of the crystal structure of the stone that is not visible by the human eye, but is detectable with a reading device or magnifying lens.

Most tags are removable either because they are not permanently attached to the tagged item, or because damage to the surface of the item can obliterate the tag. Moreover, tags require printing, impressing, or otherwise making a predetermined feature that is later examined for identification.

Ultrasonics have not generally been used for tagging purposes in the past. However, there has been developed an ultrasonic fingerprint reader that images the human fingerprint.

All of the presently known tagging methods rely upon a prearranged feature that is later examined to confirm identification of the item. Preprinted tags have the surface modification of the words and characters, and the precious stone tag has the altered crystal structure as its previously arranged feature.

Fingerprinting methods rely upon unique pre-arranged features which are most commonly surface characteristics to achieve identification of individuals.

Prior to the present invention, there has been no tagging method that does not require a prearranged feature or a surface feature. It is, therefore, an object of the present invention to provide a means and method of tagging that relies upon the natural unaltered material structure beneath the surface, or within the bulk of, the material for identification tagging.

SUMMARY OF THE INVENTION

The present invention is an apparatus and method for identification and recognition of an item by ultrasonic imaging of ultrasonic reflections from material micro-features within the bulk volume of a material. The invention is based upon ultrasonic interrogation and imaging of reflections from material micro-features within the body of material by accepting only reflected ultrasonic energy from a preselected plane or volume within the material. It is a requirement of the present invention that the material micro-features remain unchanged during the useful life of the item.

An initial interrogation produces an identification reference. Subsequent new scans are statistically compared to the identification reference for making a match/non-match decision. If a match condition is obtained, identification of the item is confirmed or authenticated, whereas if a non-match condition is obtained, identification of the item is questioned and may infer a counterfeit.

The present invention means or apparatus has an ultrasonic reader, electronic data handler, and monitor.

The reader is a structure upon which an ultrasonic transducer assembly is mounted. The structure also permits connection between the ultrasonic assembly and a coupling media. The transducer assembly provides signal transmittal and receipt at spacial increments over a two-dimensional surface. A spacial increment is a pixel.

Within the reader there is an ultrasonic transducer capable of interrogating a two-dimensional or volumetric zone defined by the open end of the container. The ultrasonic transducer is mounted to coupling media such as a boot filled with a fluid, such as water, or a cartridge of gelatinous solid.

The transducer interrogates a spatial location transmitting an ultrasonic signal into the material of the item in response to stimulation by a voltage pulse from a pulser within the electronic data handler. The received ultrasonic signal is a collection of wavelets reflected back from the material micro- and macrostructure. A first large amplitude response is received from the surface of the item. Subsequent wavelets of the reflected signal are from structures which are progressively deeper within the item at that location. Received signals are converted to electric or electronic signals within the transducer then are passed to the electronic data handler wherein the electric signals from the transducer undergo further processing steps to produce image intensity data. The image intensity data are stored until it is necessary to compare them to a second reading for identification purposes.

Comparison of images is also carried out in the central processing unit. Mean squared distance (MSD), which is similar to 1 minus the correlation coefficient, is used for comparisons. The image intensity at each pixel location from the first image is compared to the image intensity at the corresponding pixel location of the second image. To assure the proper pixel sequence is used, an alignment algorithm is used to align the first and second images. The nearer the entire-area-MSD is to zero, the better the identification or the more likely that the second image is from the same material as the first or reference image. The nearer the entire-area-MSD is to 1.0, the less likely that the second image is a match of the first image.

Materials that can be identified according to the present invention are ultrasonically transmissive and further characterized by subsurface features that can reflect ultrasonic waves or wavelets. Materials that would be less conducive to identification by the present invention include materials having a substantial amount of open interstices or pores.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 3c1 is a schematic diagram of the time variable gain amplifier controller.

FIG. 3c2 is a continuation of FIG. 3c1.

FIG. 3e is a schematic diagram of the computer interface.

DESCRIPTION OF THE PREFERRED EMBODIMENT(S)

Apparatus

Figure 1:
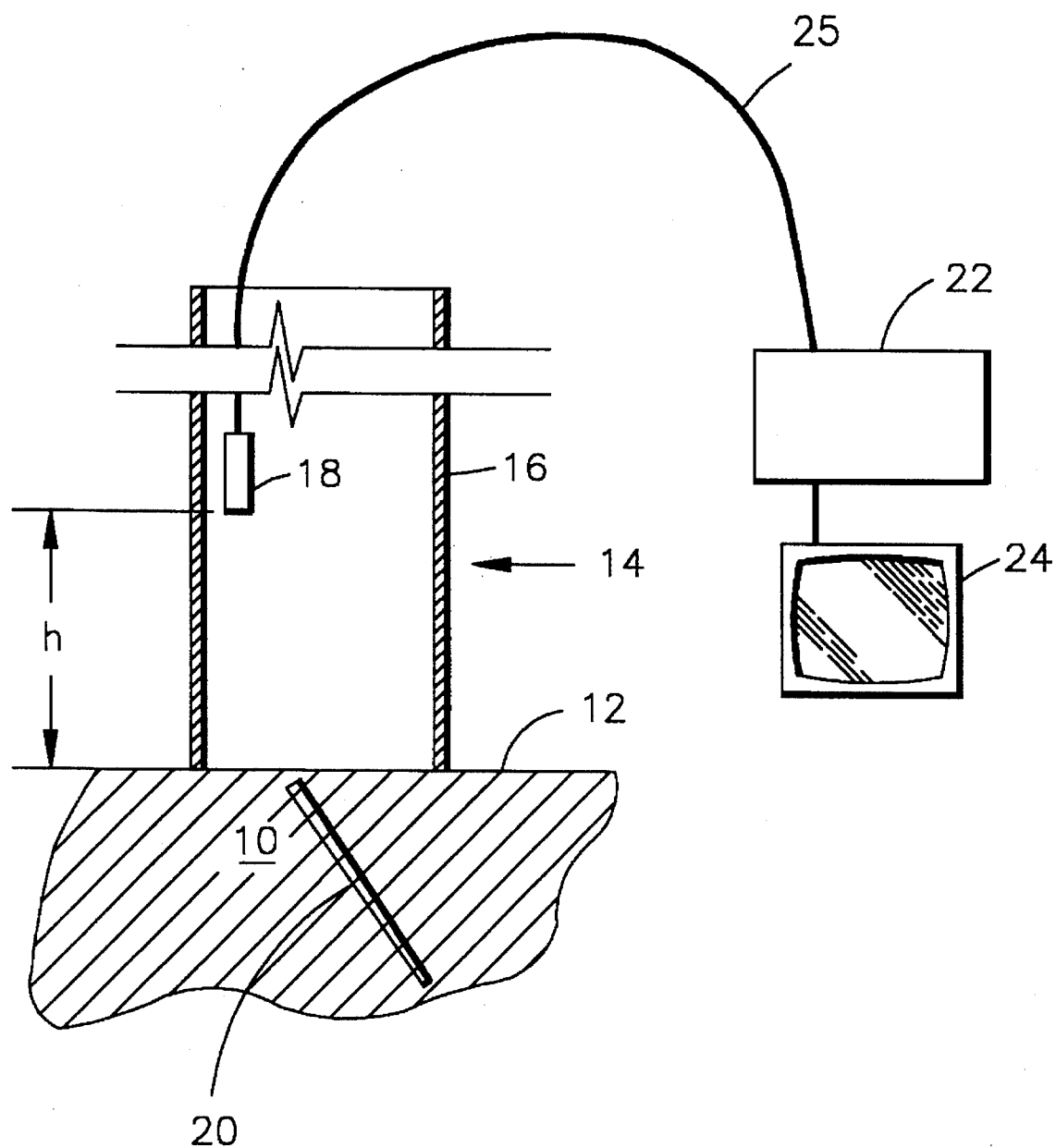
FIG. 1 is a schematic of an ultrasonic interrogation system.

An apparatus according to the present invention is shown in FIG. 1. The apparatus is for positive identification of a structural object 10 having a bulk volume and at least one exposed surface 12.

The structural object 10 may be any material or shape, such as a substantially fine grained material having a microstructure including but not limited to metal, or a composite material including but not limited to fibers embedded in an epoxy matrix.

The structural object 10 may be any material that is ultrasonically transmissive and further characterized by subsurface features that can reflect ultrasonic waves or wavelets. Materials include but are not limited to metals, pure and alloyed, ceramics single or multi-component, metal-ceramic composites, organic polymers, and fiber reinforced organic polymer composites. Metals include but are not limited to aluminum, brass, titanium, iron and respective alloys thereof, for example steel alloys. Fiber reinforced organic polymer composites include, for example Kevlar reinforced epoxy. Reinforcing fibers include but are not limited to organic polymer fibers (e.g. Kevlar), glass, and graphite. The materials may be grouped according to ultrasonic attenuation. Most metals, ceramics, and alloys or composites thereof are homogeneous and have known or determinate ultrasonic attenuation properties. On the other hand, most fiber reinforced organic polymer composites are heterogenous and do not have known or determinate ultrasonic attenuation properties. Microstructure grain size is another parameter that influences equipment selection for the ultrasonic identifier. Fine grained includes primarily metals having grain size of from about 0.01 mm to about 1.0 mm, or having grain size numbers from about 2 to about 8. Coarse grained includes primarily fiber reinforced organic polymer composites wherein at least a portion of the fibers have a dimension greater than about 0.1 mm. Organic polymers also exhibit a structure that reflects ultrasonic signals, but the organic polymer reflective structure may or may not be in the form of grains. Hence, metals are determinate attenuation fine grained materials whereas composites, not otherwise specified, are fiber reinforced composites or indeterminate attenuation coarse grained materials. Materials that would be less conducive to identification by the present invention include materials having a substantial amount of open interstices or pores making them ultrasonically nontransmissive, for example paper, leather, and wood.

The object thickness may range from about 1 mm to about 2 cm or larger.

An ultrasonic reader 14 is set on the surface 12 and has a housing 16 and at least one ultrasonic transducer 18 mounted therein. The housing 16 may be any shape, but is preferably of rectangular cross section defining a rectangular or square area on the surface 12.

The ultrasonic transducer 18 may be a single transducer mounted on a mechanical two dimensional scanner or a plurality of transducers mounted on a one dimensional mechanical scanner, or a two dimensional array of transducers requiring no mechanical scanner. In a preferred embodiment, a scan is obtained by translating one or more transducers over a two-dimensional surface with an established spatial increment less than one-half the ultrasonic field width. A single line scan by a single transducer, however, has also been shown to work.

The ultrasonic transducer 18 may be any type, but is preferably able to focus the acoustic field. For example a model V3595 available from Panametrics, Waltham, Mass., having a focal length of 5 cm, frequency rating of 5 MHz and a 13 mm diameter active element was used for composites. Another example is the Panametrics V317 transducer having a focal length of 2.5 cm, frequency rating of 20 MHz and a 6 mm diameter active element which was used for metals.

A focused transducer permits scanning a smaller area and obtaining higher resolution of bulk volume features compared to an unfocused transducer. For metals, the focused transducer should have an f-number in the range from about f1 to about f6 and preferably about f4. For composites, either a focused or nonfocused transducer may be used exhibiting f-numbers from about 1 to infinity or non-focus. This is because metals have much smaller features on the order of metal grains, whereas composites have much larger features of fibers within an epoxy matrix and ply-to-ply variations.

Transducer frequency may range from about 10 MHz to no upper limit for metals and from about 1 MHz to about 20 MHz for composites. For metals, the preferred frequency is about 20 MHz, and for composites the preferred frequency is from about 3–5 MHz.

The transducer 18 may be normal to the surface as is the case for materials such as epoxy based composites or at oblique incidence at an angle close to 18 degrees for metals. Usage on thin structures such as a 2 mm metal sheet is enabled by the oblique incidence angle. The oblique incident angle is selected for efficient conversion of a longitudinal wave to a shear wave at the surface of the item 12. The large amplitude wave reflected by the surface travels away from the transducer and eliminates a large signal source which tends to mask weaker underlying features. Transducer features which contributed to thin material usage include high frequency such as 20 MHz for increased depth resolution, high damping to increase depth resolution (decrease ultrasonic pulse duration), and a focused transducer to minimize the footprint of the ultrasonic field on the item. A smaller footprint, reduces the time duration that responses from surface roughness are received and can cause interference.

Amplifier gain for metals is preferably from about 30 dB to about 60 dB which is about a factor of 100 more than that from conventional flaw detection ultrasonics equipment. Amplifier gain for the composite system is from 0 to 60 dB, and preferably about 10 dB depending upon received response levels of a material volume.

Where a plurality of transducers are used in an array, it is preferred that each transducer operate at the same frequency, f-number, and sensitivity. When using more than one transducer, it is further preferred to treat each image sub-area separately so that data scaling will reduce sensitivity differences between transducers. Whether one or many transducers are used, it is preferred that the sonic pulse from the transducer(s) be of short duration so that there is a time between transmit and received echo, and that adequate depth resolution is obtained.

It is desirable to interrogate any two dimensional plane 20 within the bulk volume, for example, any plane that is either parallel or perpendicular to the surface 12, or oblique to the surface 12, as shown in FIG. 1. For interrogation of metals, it is preferred to incline the transducer so that shear waves are produced in the metal, because shear waves are more sensitive than longitudinal waves to Rayleigh scattering from the small grain-sized features. For interrogation of large-featured composites, it is preferred to use either a plane approximately parallel to the surface 12, or perpendicular to the surface. The ultrasonic transducer 18 is physically located within about 1 focal length from the interrogated plane 20 so that the focal zone of the transducer straddles or is centered about the interrogated plane. It is not necessary to know the exact orientation of the interrogated plane 20, but it is necessary to repeatably interrogate at the same plane orientation for subsequent interrogations.

Repeatability is measured by statistically testing a classifying algorithm in a performance test. The classifying algorithm may be any of a variety of algorithms that permit classification into either a match or non-match criteria, for example a correlation function. It is preferred, however, to use the same algorithm that is used for the actual data reduction, namely the Mean Squared Distance (MSD). The data is scaled such that a comparison on an image with itself yields 0.0, a perfect match. If scans from two different material volumes are compared, random non-matching features should produce an expected value of 1.0, a perfect mismatch. Comparison of replicate images should yield values near 0.0 which are characteristic of image variations or noise caused. Repeatability is a measure of how often replicate scans are classified as a match compared to an erroneous classification as a mismatch. For the scaled MSD algorithm, this is the probability that a comparison between the reference and new scan are below a selected MSD threshold value.

As with most ultrasonic systems, a couplant is necessary between the ultrasonic transducer 18 and the surface 12 of the bulk volume 10. The couplant may be any couplant used for this purpose; for example, fluid, gel, gelatinous solid, or water. The preferred couplants for the composite and metal material interrogation apparatus were, respectively, a cartridge of gelatinous solid, and a water boot about the transducer formed by a latex membrane of 0.05 mm thickness. A gel cartridge couplant used was Aquaflex obtained from Parker Laboratories, Inc., Orange, N.J., and was placed between the ultrasonic transducer 18 and the surface 12. In addition, a second couplant, Ultragel II from Echo Ultrasound in Reedsville, Pa., was used at the interfaces between the cartridge and the ultrasonic transducer 18, and between the cartridge and the surface 12. Other ultrasound generator/receiver equipment may be used including, but not limited to, laser ablation heating, interferometry, and electromagnetic acoustic transducer (EMAT).

The reader 14 is used for obtaining a collection of ultrasonic reflections from a plurality of point locations on the interrogated plane 20 within the bulk volume 10. The ultrasonic transducer 18 receives ultrasonic reflections and the preamplifier transmits these by means of cables within an umbilical cord to the electronic data handler 22. The amplified data are analog-to-digital converted prior to passing to a central processing unit. The electronic data handler 22 includes a central processing unit which has several instruction sets for reducing and storing the ultrasonic reflection data. The central processing unit also sends data to a monitor 24 for display of the data to the operator.

Amplified and converted signals are further processed within the central processing unit by examining them within a pre-selected time window commonly referred to as a gate to accept reflected or wavelet signals from a preselected depth zone within the material volume. From the within-volume reflected signals, quantified amplitudes are obtained. Scans having a vertical spatial component, for example oblique angle planes and/or convoluted surface geometries, are obtained by positioning of the transducer assembly in cooperation with variable depth zone gating. A horizontal scan is obtained by using variable transducer assembly position but having a fixed or constant depth zone gate. Planar scans are preferred to relax reader position tolerance. The quantified amplitude at a spatial location in the item may be either the peak amplitude or the root-mean-squared value of the gated signal. An array of quantified amplitudes at scanned locations form the image or identification pattern. Each quantified amplitude is expressed in terms of an image intensity, and cataloged by position coordinates. The image intensity data are stored until it is necessary to compare them to a second reading for identification purposes.

Figure 2:
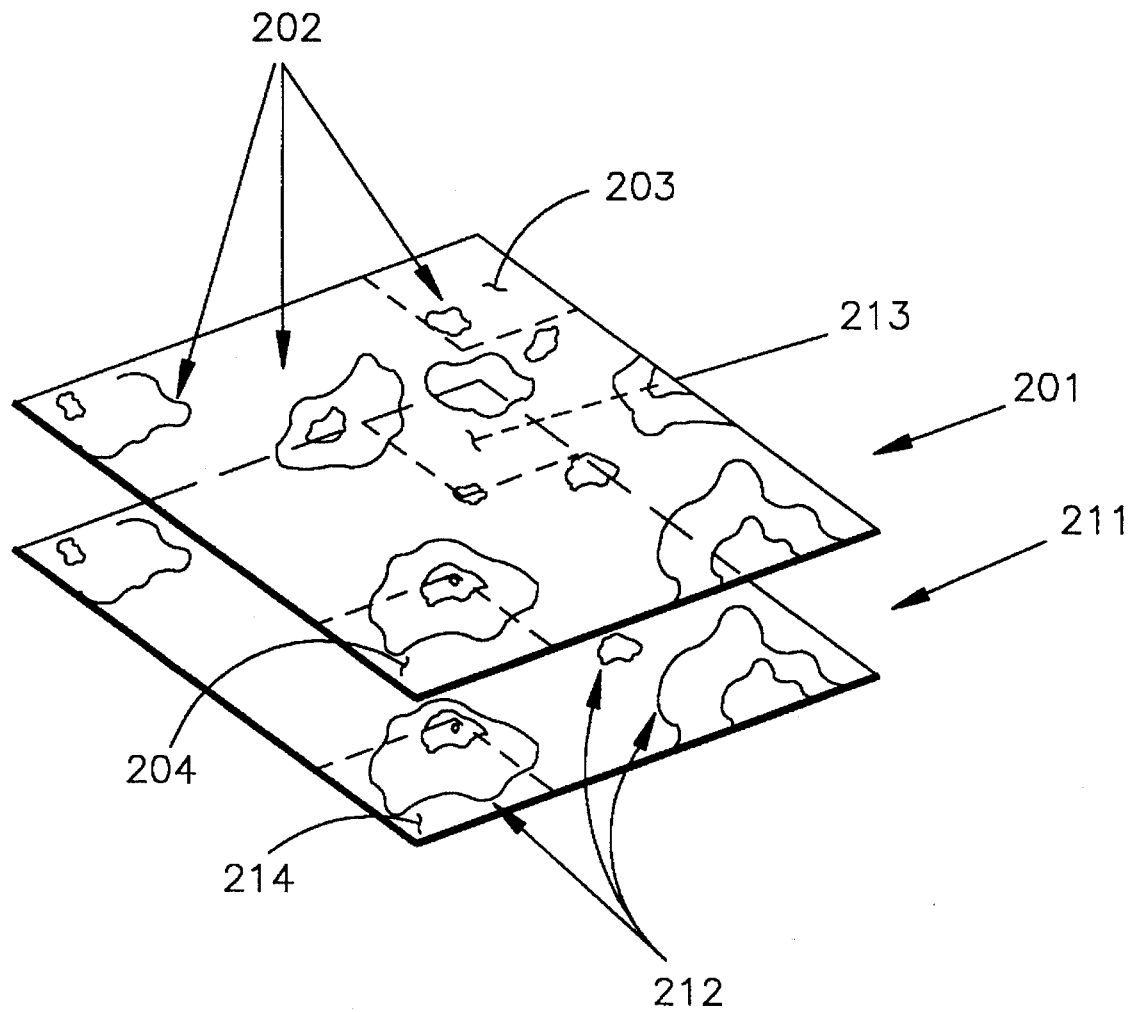
FIG. 2 is an illustration of material features from a plane within a bulk material.

A first set of instructions is for scaling the reflection data. There are many scaling algorithms that may be used, but a preferred algorithm relies on obtaining a statistical mean of the amplitudes or image intensities of the reflection data, together with a standard deviation statistic. Next, the statistical mean is subtracted from each image intensity and each difference is divided by the statistical standard deviation to provide scaled image intensity data. The first set of scaled image intensity data taken from a bulk volume 10 is referred to as an identification reference and the second set of scaled image intensity data is referred to as a new scan. FIG. 2 shows a graphical representation of scaled image intensity data for an identification reference image 201. The identification reference image 201 has features 202 and diagonally opposed subareas 203 and 204. Also shown is a new scan image 211 having features 212 and subareas 213 and 214. Scaled image data are stored, preferably on retractable storage media including but not limited to floppy or optical disks for subsequent reading back to the central processing unit.

The central processing unit has a second set of instructions for aligning the identification reference scan image 201 with the new scan image 211. Alignment consists of a displacement horizontally or vertically, or in time together with a rotation. In a preferred instruction set for alignment, diagonally opposed subareas (203 and 204, 213 and 214) are selected both in the identification reference image 201 and in the new scan image 211. Each sub-area is translated along the two coordinates axes of the image roster and result in corrections of $(\Delta x_{s1}, y_{s1})$ and $(\Delta x_{s2}, y_{s2})$. The averages of these is an image translation, while the differences used in image rotation occurs with an appropriate spatial time (depth image) and rotation. It will be recognized by those skilled in the art of image alignment that selection of subareas is not necessary for alignment. The entire area could be used to obtain a more rigorous alignment, but at the expense of additional computational time.

A third set of instructions is for comparing the identification reference 201 to the new scan 211. Many comparative algorithms are available, but a preferred algorithm uses a mean squared distance between the aligned identification reference 201 and new scan 211. The standard mean squared distance statistic, T, is the square root of the sum of the differences of the squares of the individual scaled image values from the identification reference and the new scan at each location. In order to simplify and increase the speed of processing, the extraction of the square root is preferably omitted from the calculation. The equation used is $$MSD = T = \frac{1}{2M_1 M_2} \sum_{x=1}^{M_1} \sum_{y=1}^{M_2} [A_{ij}'(x,y) - A_{kl}'(x,y)]^2$$

where $A'_{ij}$ and $A'_{kl}$ are scaled versions of the original images $A_{ij}$ and $A_{kl}$, respectively, and the first index (i) represents the scan number, while the second index (j) represents the location within the material volume. The scaling process removes the mean and a normalization is performed by dividing by the standard deviation as follows:

$$A_{ij}(x,y) = \frac{\Delta_{ij}(x,y) - M_{ij}}{\sigma_{ij}}$$

A match of identification reference 201 to new scan 211 results in a mean squared distance close to a numerical value of 0 whereas a mismatch results in a mean squared distance numerical value close to 1. One reason for selecting the mean squared distance statistic was that a signature or image is representable with a signal-plus-noise model where the signal is the repeatable portion of the image and noise is the image variation that occurs with each scan. Assuming that the signal and noise are stationary Gaussian random processes, unbiased estimates from the signal and noise are quantifiable as $$\hat{S}_i(x,y) = \frac{1}{m} \sum_{0=1}^{n} A_{ij}(x,y)$$

$$\hat{N}_{ij}(x,y) = A_{ij}(x,y) - \hat{S}_i(x,y)$$

Moreover, the match and nonmatch distributions of the mean squared distance statistic are computable from a limited set of empirical data by using two-dimensional Fourier analysis to synthetically generate images. If differences exist in the Fourier spectrums of the signal and noise images, a filter may be also employed to substantially exclude noise variations.

Two types of errors can occur, false call and non-detection. The probability of false call is an error probability of classifying two images that are from the same material volume as being different. The main contributing factor to a false call is noise. Therefore, reduction of noise reduces probability of false call.

The probability of non-detection is an error probability that two images that are different are classified as matching. This error depends upon the number of repeatable signal features in an image. With an increasing number of features, the probability of non-detection decreases.

The display 24 permits an observer to view either a numerical result from the mean squared distance calculation, or a planar map of features as depicted in FIG. 2, or both.

Figure 3A:
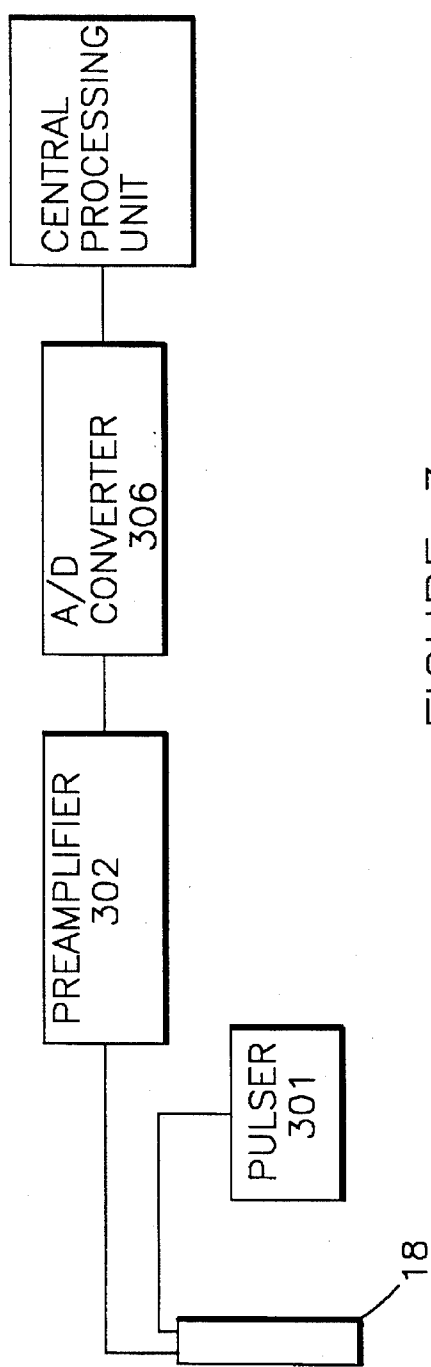
FIG. 3a is a block diagram of electronic components for heterogenous materials such as metals, composites, and ceramics.
Figure 3B:
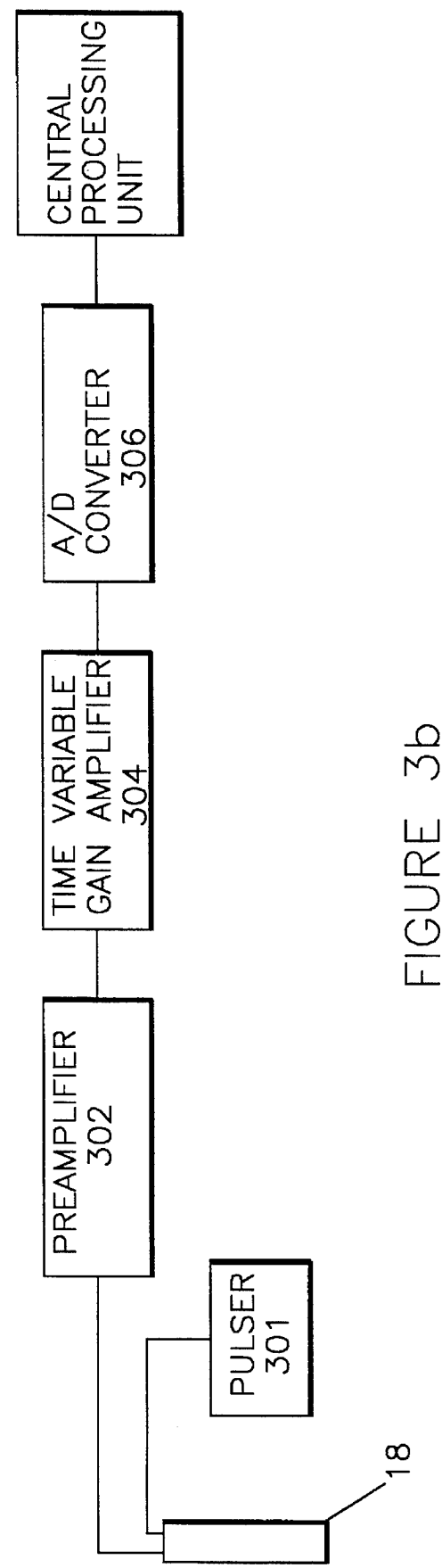
FIG. 3b is a block diagram of electronic components for polymer based composite materials.

The electronic data handler 22 (FIG. 1) contains additional elements as shown in FIGS. 3a and 3b. FIG. 3a contains the elements needed for interrogation of metals, and FIG. 3b contains the additional elements needed for interrogation of composites.

For both metals and composites, the ultrasonic transducer 18 is energized by a pulser 301. The pulser 301 may be any pulser, but is preferably a pulser having computer control of standard pulsing features such as output voltage, damping, number of cycles, frequency, a software trigger, and temporary turn off of noisy sources such as a power converter.

The output voltage of the pulser for the composite system produces a large negative pulse of either a spike or square wave of approximately −400 Volts. A larger voltage generates stronger ultrasonic waves which implies a better amplitude-to-electrical-noise ratio. It is preferred that this ratio be greater than 1, and more preferably greater than 2. Voltages may range from 10 Volts to 1000 Volts. The voltage is limited by the electrical capacity of the transducer. More specifically excess voltage can overcome the dielectric strength of the piezoelectric material within the transducer, and/or de-pole the piezoelectric material thereby making it not piezoelectric. The voltage is also limited by recovery time of the preamplifier. An excessive voltage saturates the preamplifier and results in a long voltage decay time (several microseconds for composite material interrogation, fraction of a microsecond for metal material interrogation) preventing collection of further data until sufficient decay has occurred. A clipping circuit is preferably included to limit the potential for an over voltage event. A broad frequency distribution of excitation permits the transducer to respond at preferred (natural or resonant) frequencies thereby limiting the frequency generation of the transmitted ultrasonic signal. Thus, use of broad frequency distribution results in generation of midfrequencies which have better spatial resolving capabilities and low-frequencies which are needed for penetrating into items consisting of attenuative materials. A square wave pulse is preferred since this permits greater control of the ultrasonic frequency than does other waveforms. Damping resistance controls transducer ringing and modifies the pulse rise time and fall time. Damping resistance may be from a few ohms to several megohms.

Preferred pulser parameter settings for interrogation of composite materials were 375 Volts, 634 ohms damping, square wave at 3 MHz frequency.

The pulser for interrogation of metals is set to produce a narrow frequency band signal by at least one alternating cycle at a selected frequency, and preferably a plurality of alternating cycles. The number of alternating cycles ranges from about 1 cycle to about 20 cycles. An interference pattern produced from reflections from multiple locations and multiple wavelets is necessary to identification for metals. The interference pattern is sensitive to frequency and, hence, control of frequency creates stable identification signature. The greater the number of cycles the purer the frequency generation of the transducer with the tradeoff of decrease in depth resolution. The goal is to excite the transducer into a frequency much narrower than that the transducer natural or resonant frequency and therefore control transducer transmission frequency with the pulser. For function reliability when exchanging modules, one pulser should appear as another pulser; however, transducers are known to vary in frequency response.

There are several pulsers available meeting the above described specifications and performance requirements for example, a model PCPR-100 available from Adaptronics Products, A Division of General Research Corporation, Goleta, Calif. The same pulser can be used for both composite and metal interrogation, but it is preferred to modify the pulser for metal interrogation. As purchased, the pulser provides a tone burst characteristic of a single cycle with decay at frequencies near its upper limit of about 20 MHz. Modifications made to the purchased PCPR-100 included (1) additional components to speed up the four half-cycles to match the symmetry of the negative half-cycles so that there is provided a four cycle tone burst at about 20 MHz, (2) addition of shielding material to reduce noise from an adjacent computer, (3) replacing the damping circuit with a single resistor, again for the purpose of reducing noise because the damping circuit acted as an antenna attracting noise from the computer, and (4) adding a capacitor to the high voltage supply within the pulser for the purpose of making pulser wave output closer to an ideal square wave shape.

The speed-up of the four half cycles was done by placing a series resistor and a parallel tuning capacitor in the purchased pulser on the gate side of both the positive and negative DMOS field effect transistors (FET's). The selection of resistance and capacitance depends upon the internal electronic characteristics of a particular FET. For the particular purchased pulser, preferred values are 22 ohm and 100 pf for the positive FET with 56 ohm and 1000 pf for the negative FET. Values of resistance or capacitance within about 25% of the preferred values would be acceptable and expected to perform about as well as the preferred values. Expanded values beyond 25% would be operable, but may be less preferred.

Because the pulser is placed sufficiently near a computer that radiofrequency output from the computer produces noise in the pulser, it was necessary to shield the pulser from the computer. The shield is preferably of electrically conductive material and grounded. A portion of brass shimstock was placed over the FET's and other components within the pulser and soldered to ground.

The purchased pulser has an output damping circuit having several resistors and switches which all act as antennae in a radiofrequency field and further contribute to noise. Thus, the damping circuit was replaced with a single resistor having a resistance substantially impedance matched with the connecting cable.

It is desired to make the pulser output as close as possible to an ideal square wave shape. Addition of a capacitor to the high voltage supply resulted in a "squarer" wave output. It is preferred that the leads to the capacitor are short enough to avoid inductance. The capacitor must be compatible with the voltage output of the high voltage supply, but value of capacitance is not critical. A 0.05 micro-f capacitor was used.

Electric signal output from the ultrasonic transducer 18 is first passed through a preamplifier 302 to increase the signal strength. Although the same preamplifier can be used for composite and metal interrogation, it is preferred to use different preamplifiers for composite material and metal material interrogation. For composite material interrogation, it is sufficient to have an upper cutoff frequency of about 10 MHz, but for metal material interrogation, an upper cutoff frequency over 20 MHz is needed.

Commercially available preamplifiers were tried but found to either produce excessive noise, or have a large physical size. Thus, a preamplifier was constructed of low-noise components of a front-end diode bridge protection circuit and a single stage amplifier. The single stage amplifier also functioned as a line driver. This preamplifier having an upper cutoff frequency of 10 MHz was used for composite material interrogation. The preamplifier for metal material interrogation needs at least a 20 MHz upper cutoff frequency, and preferably about 30 MHz. An additional stage of amplification was added to the preamplifier used for composite interrogation to achieve the required upper cutoff frequency.

Because the metal material images are taken from materials having predictable attenuation properties, or taken from thin sheets wherein response variations as a function of depth are mathematically negligible, an attenuation factor was used in the central processing unit and a time variable gain amplifier was not required for metal material interrogation. In composite materials, the attenuation is unpredictable making it impractical to insert an attenuation factor into the data reduction instruction set. Thus, a time variable gain amplifier 304 is used to provide the necessary attenuation correction for obtaining a composite material image based upon macrostructural features across a range of composite thicknesses in a single pass of the transducer assembly. Response reduction over depth in composites occurs from ultrasonic attenuation by the composite material, ultrasonic field divergence after the focal length, and scattering from material reflectors. The time variable gain amplifier establishes amplification as a function of time or depth to compensate for such response reductions. Alternatively, multiple interrogations of the same material volume would be needed to overcome a finite dynamic range of an analog-to-digital converter. Amplification may be set by ramp functions to establish set gain levels for specific material depths.

Ultrasonic time variable gain amplifiers (TVGA) used in medical diagnostic imaging systems could not be used in the present invention because they were not computer controlled. In order to achieve computer control of the TVGA, an interface circuit is needed between the TVGA and the computer. Hence, the time variable gain amplifier 304 was designed and constructed according to the following specifications. A maximum gain amplification limit exists and ramp functions set the gain levels so that macrostructural responses are nearly the same amplitude level over the depth range of interest. Any upper dB limit may be set and electronic noise is a limiting factor. The preferred upper dB gain level is 40 dB. Any number of ramp function may be used to contiguously alter gain as a function of depth. The preferred ramp number is three to keep circuitry simple. The time duration of each ramp may be set in any given increment up to any maximum level. The preferred increment and maximum duration respectively are 167 nanoseconds and 10.8 microseconds.

Following the preamplifier 302 for metals and the time variable gain amplifier 304 for composites, is an analog to digital (A/D) converter 306. The A/D converter may be any type from the kilohertz to the gigahertz range but is preferably in the megahertz range. The same A/D converter may be used for metals or composites interrogations.

Although described as being within the electronic data handler 22, the previously described elements can be located within the reader 14, some elements located within the reader 14 with others located within the electronic data handler 22, or the entire unit miniaturized and contained within one unit.

A TVGA controller, TVGA, front surface detector, missing pulse detector, and computer interface circuit are shown in greater detail in FIGS. 3c1 and 3c2, 3d, and 3e.

The Ultrasonic Time Variable Gain Interface (TVGI) controller automatically sets a host programmable gain versus time profile for ultrasonic testing. The function of the TVGI controller is to implement this profile as a gain adjustment to raise the detected acoustic response as it penetrates the scanned material. Gain is continually increased to compensate for response reduction due to sources such as material attenuation. The interface may be installed in any IBM PC or compatible computer, and may be used with any manufacturer's PC based ultrasonic scanning system. The gain versus time profile and front-surface detection threshold are downloaded to the card over the PC bus. The host computer can read these values back along with diagnostic data. The software for the TVGI controller resides in reprogrammable EPROM and consists of an assembly language program. There is also an auxiliary RS-232 port for software debugging and board troubleshooting.

FIG. 3c1 shows a gain ramp having at least three slopes of voltage versus time, a first slope that is horizontal (ordinate is constant), a second slope that is positive, and a third slope that is positive. A gain ramp is a combination of slopes. The gain ramp, or combination of slopes is controlled or assembled by the gain ramp controller that combines distance parameter(s) from the slope latches and time parameter(s) from the time latch.

Figure 3D:
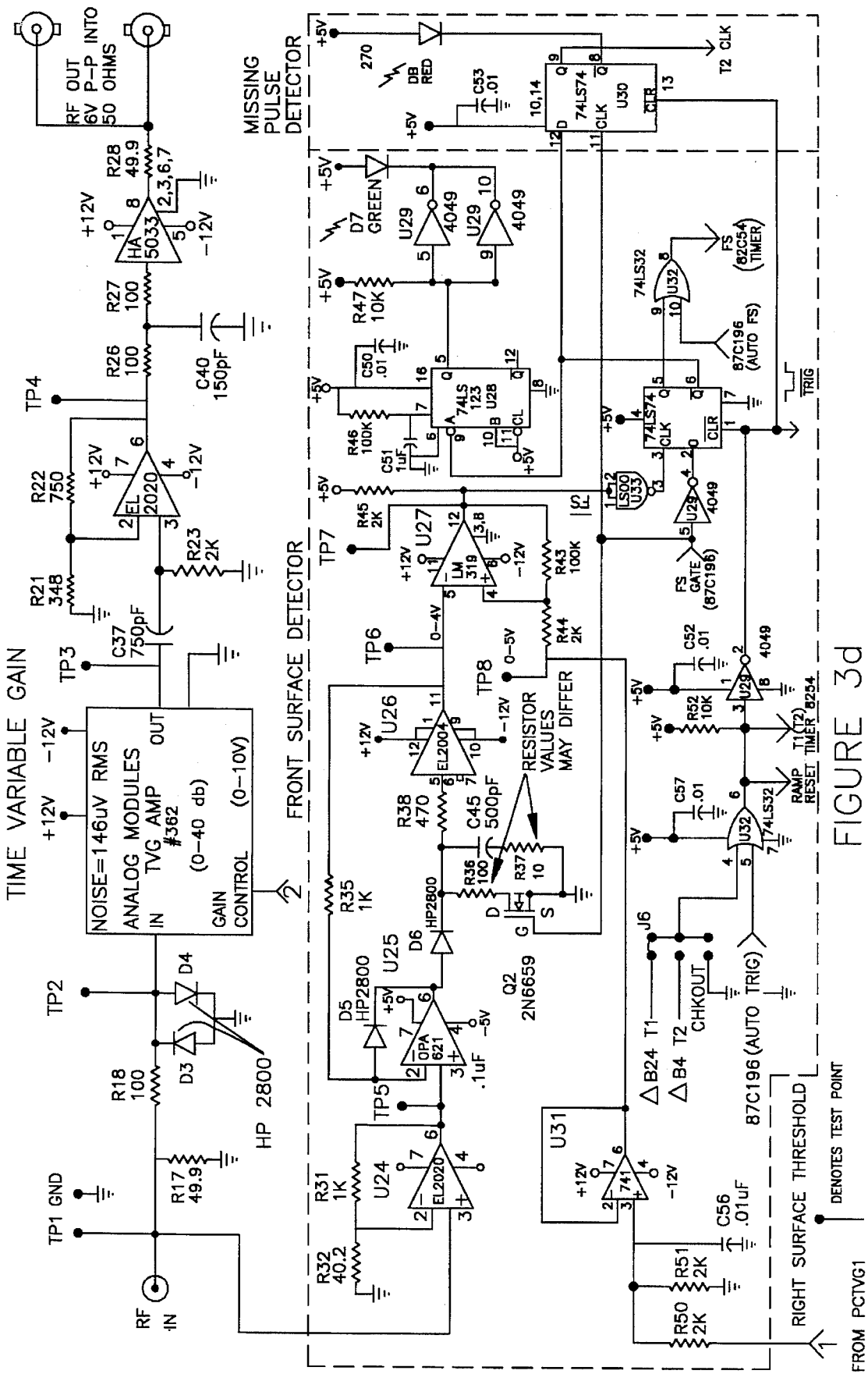
FIG. 3d is a schematic diagram of the time variable gain amplifier, front surface detector, and missing pulse detector.

FIG. 3d shows the time variable gain amplifier component with amplified signal output to a front surface detector followed by a missing pulse detector.

FIG. 3e shows the computer interface circuit for connecting the TVGA controller circuit to the PC BUS or computer.

Method

The method of the present invention utilizes the apparatus of the present invention for positive identification of a structural object having a bulk volume and at least one surface using the following steps.

It was recognized that the ultrasonic transducer focus was typically much greater than the size of most subsurface features and, therefore, could not produce a clear image of the subsurface features. Thus, the invention relies upon an abstract image produced from reflected waves that are larger than the features. Although the features themselves are not distinguishable or imageable with this approach, the abstract image based upon reflections from those features is unique for a specific location within the material. In metals, the focus is much greater than the size of the largest subsurface feature and, therefore, a clear image of the subsurface features is not possible. In composites, many subsurface features are smaller than the focus, but some subsurface features, for example a fiber, are larger than the focus and clear images of those larger features are superimposed on the abstract image of unresolved fine subsurface features.

An identification reference is defined by making a first selection of a plane within a first bulk volume of the structural object then obtaining a first collection of ultrasonic reflections from a plurality of point locations on the first selected plane and scaling the first collection of reflections to provide scaled image data stored as an identification reference.

A new scan is made by interrogating the bulk volume a second or subsequent time by making a second or subsequent selection of a plane within the bulk volume and obtaining an additional collection of ultrasonic reflections from a plurality of point locations on the selected plane and providing scaled image data as a new scan.

The identification reference and new scan data sets are aligned to facilitate comparison.

Comparing the identification reference to the new scan is preferably done using a mean squared distance between the aligned identification reference and new scan. Values of mean squared distance close to 0 correspond with a comparison conclusion that the two data sets are from the same material plane or volume, whereas values of mean squared distance close to 1 correspond with a comparison conclusion that the two data sets are from different material planes or volumes.

Figure 4:
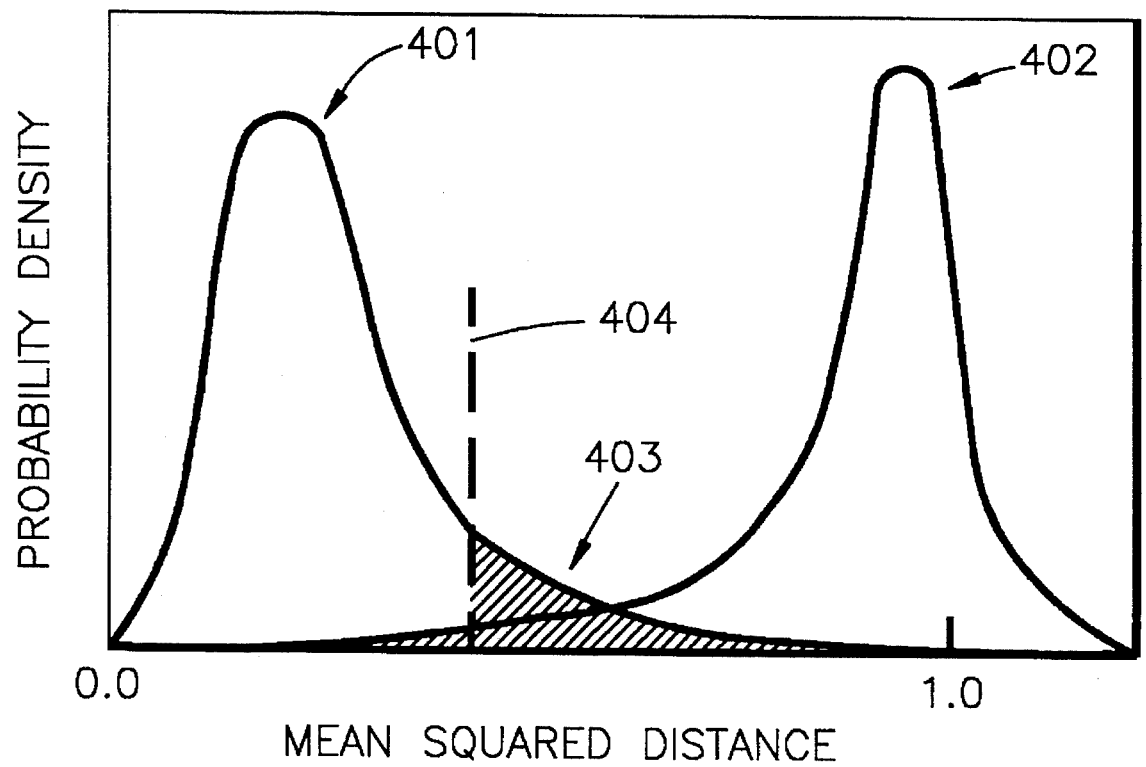
FIG. 4 is a match/non-match probability distribution.

Reliability of the comparisons is important. Reliability or performance of an ultrasonic interrogation system is quantified by interrogating a number of planes and a number of surface locations to obtain a number of new scans. By comparing these new scans to the identification reference, a distribution of matching and non-matching data is obtained. FIG. 4 shows a bimodal distribution with a first mode 401 the match distribution and the second mode 402 the non-match distribution. The hatched area 403 represents the probability of a false call and nondetection as defined by a selected threshold value 404.

Further definition of reliability is obtained by parametric studies of image or mean squared distance variability resulting from ultrasonic transducer 18 change-out, different operator, different reader 14, temperature variations, and material variations. Other parameters may also be investigated to quantify their effect on system reliability.

EXAMPLE 1

A statistical study was performed to assure sufficient image features were obtained so that a highly unique image was assured for identification. Limited empirical data was obtained from which image variation or noise was characterized by the subtraction of repeat images. The signal or repeatable portion of the image was the average of numerous repeat images. Replicate scans when compared using a scaled mean squared distance value must be less than 0.3.

The spatial frequency of the signal and noise images were used to synthetically generate scan images (signal plus noise). The image noise is from 0.0 to 0.5 scaled MSD. Observed noise ranges from 0.05 to about 0.2 scaled MSD. These synthetic scan images were used to determine the probability of different material volumes having statistically similar images and erroneously classified as being the same. A design criteria was to acquire error rates on the order of one-out-of-a million. Fourier analysis was used to obtain estimates of the probability of non-detection as a function of aperture size and sampling density. The Nyquist limit required location spacing to be equal or less than one-half the inverse of the highest spacial frequency of the signal image.

For the composites system (Kevlar-epoxy) where the Panametrics V3595 transducer was utilized, a 5 cm by 5 cm scan with a 0.5 mm spacing between adjacent points was determined to meet the error rate criteria. For the metals system where the V317 transducer was utilized, a 5 mm by 5 mm scan with a 0.05 mm spacing between adjacent points was determined to meet the error rate criteria. The area size is dependent of the focal properties of the transducer, the richness of images features produced by the material microstructure, and the desired error rates. The more relaxed the error rates, the smaller the required scanned area or material volume.

EXAMPLE 2

Experiments were conducted to demonstrate operation of the interrogation/tag system. Fiberglass-epoxy and graphite-epoxy coupons were used. Data were obtained from each coupon to establish an identification reference for each coupon. Subsequent new scans were performed at various locations and planes parallel to the surface within the coupons at selected depths corresponding to gated times where the ultrasonic response from the material was sampled. The near, middle and far gates were set at 1.0 to 2.5 microseconds, 2.0 to 3.5 microseconds, and 3.0 to 4.5 microseconds. Since the gates were at set time ranges, the three planes of material are scanned at fixed depths and the interrogated planes were parallel to the exposed surface.

Figure 5A:
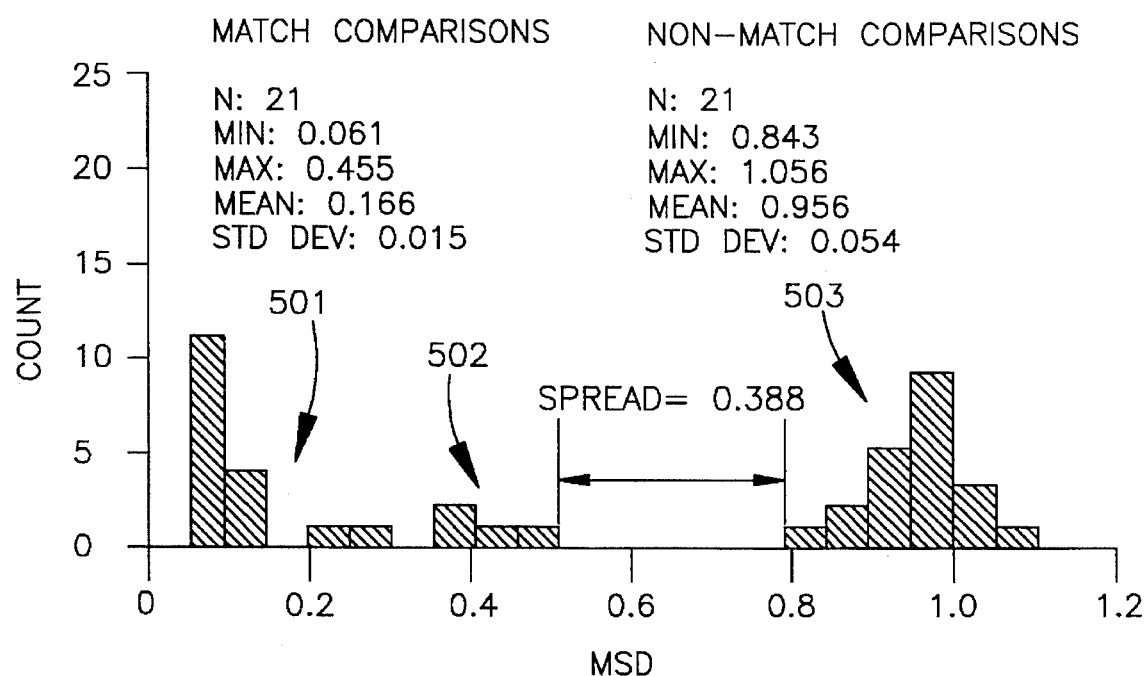
FIG. 5a is a match/non-match probability histogram for near-gate scans of fiberglass-epoxy coupons.
Figure 5B:
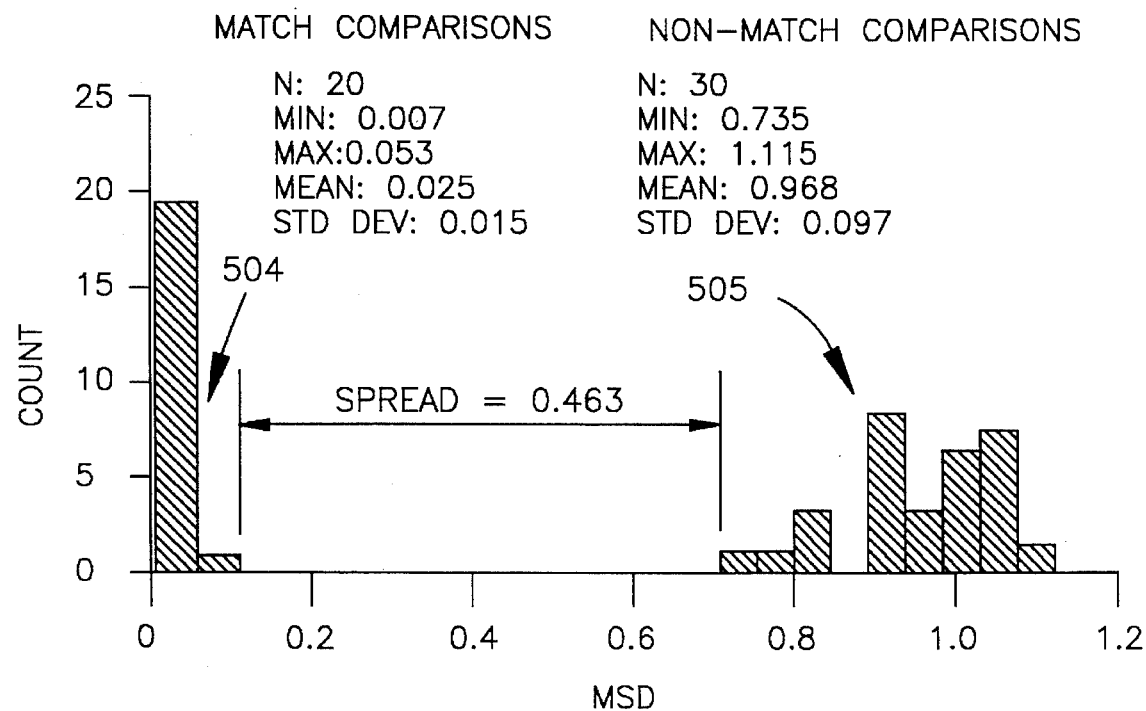
FIG. 5b is a match/non-match probability histogram for far-gate scans of fiberglass-epoxy coupons.

For the fiberglass-epoxy coupons, histograms of number of trials (count) versus mean squared distance (MSD) are shown in FIGS. 5a and 5b for near-gate scans and far-gate scans. The near-gate scan histogram (FIG. 5a) shows that the match distribution 501 has a tail 502 approaching close proximity to the non-match distribution 503. The far-gate histogram (FIG. 5b) shows adequate separation between the match distribution 504 and the non-match distribution 505. It is concluded that for fiberglass-epoxy composites, far-gate scanning is preferred over near gate scanning.

Figure 6A:
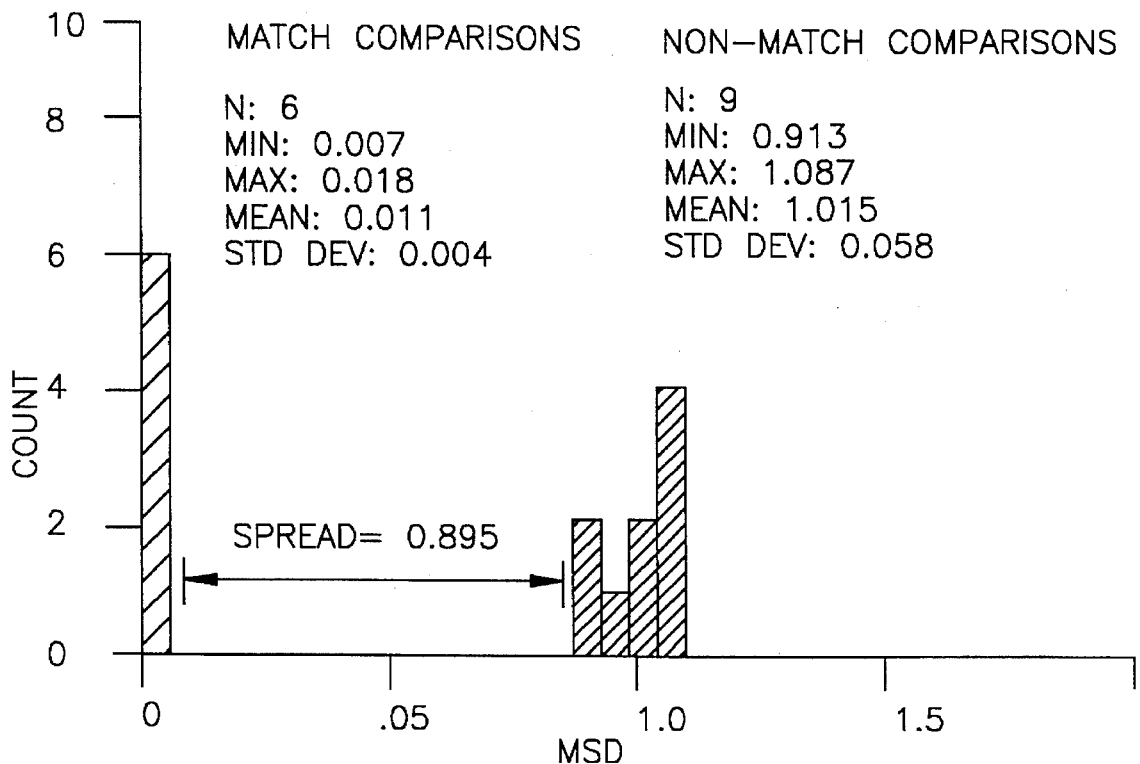
FIG. 6a is a match/non-match probability histogram for far-gate, single calibration scans of fiberglass-epoxy coupons.
Figure 6B:
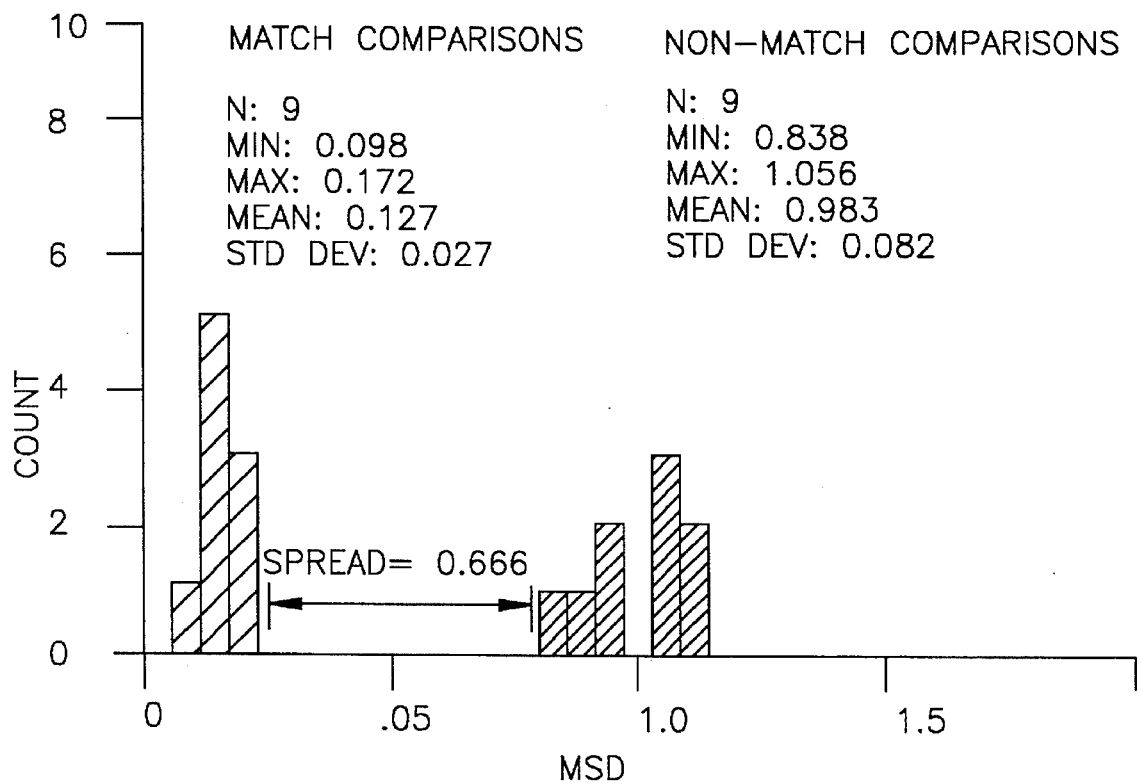
FIG. 6b is a match/non-match probability histogram for far-gate, multiple calibration scans of fiberglass-epoxy coupons.
Figure 7A:
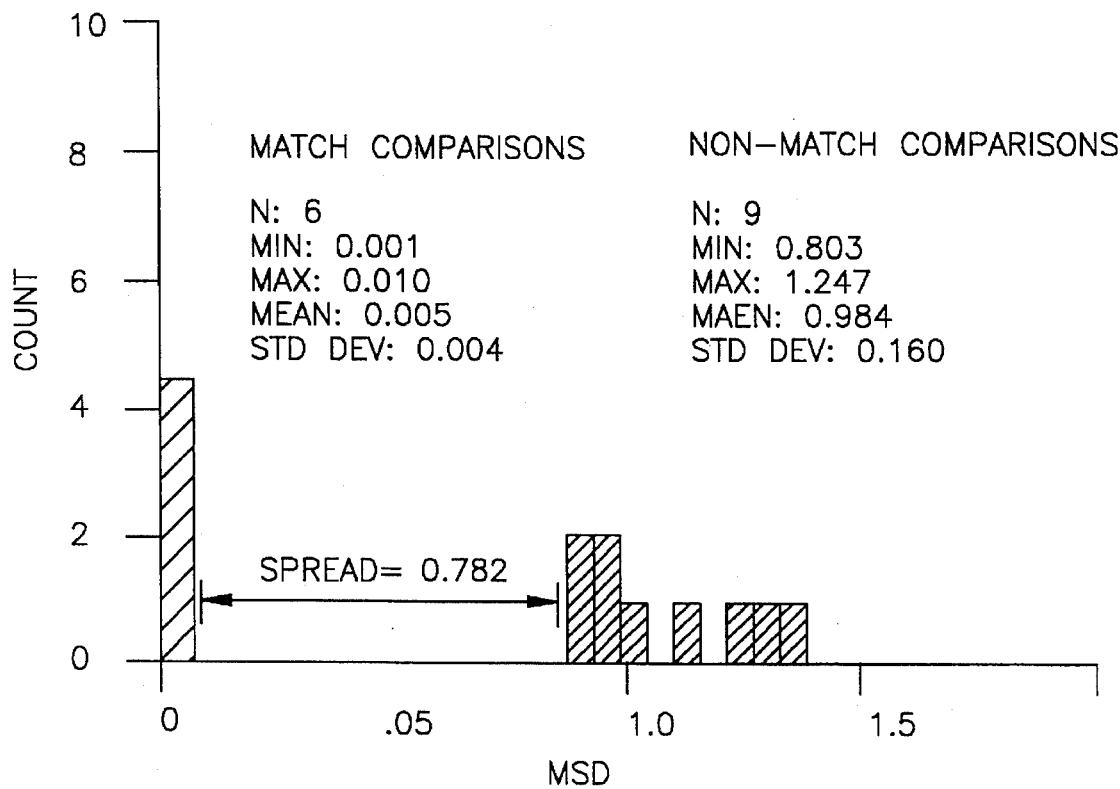
FIG. 7a is a match/non-match probability histogram for far-gate, single calibration scans of graphite-epoxy coupons.
Figure 7B:
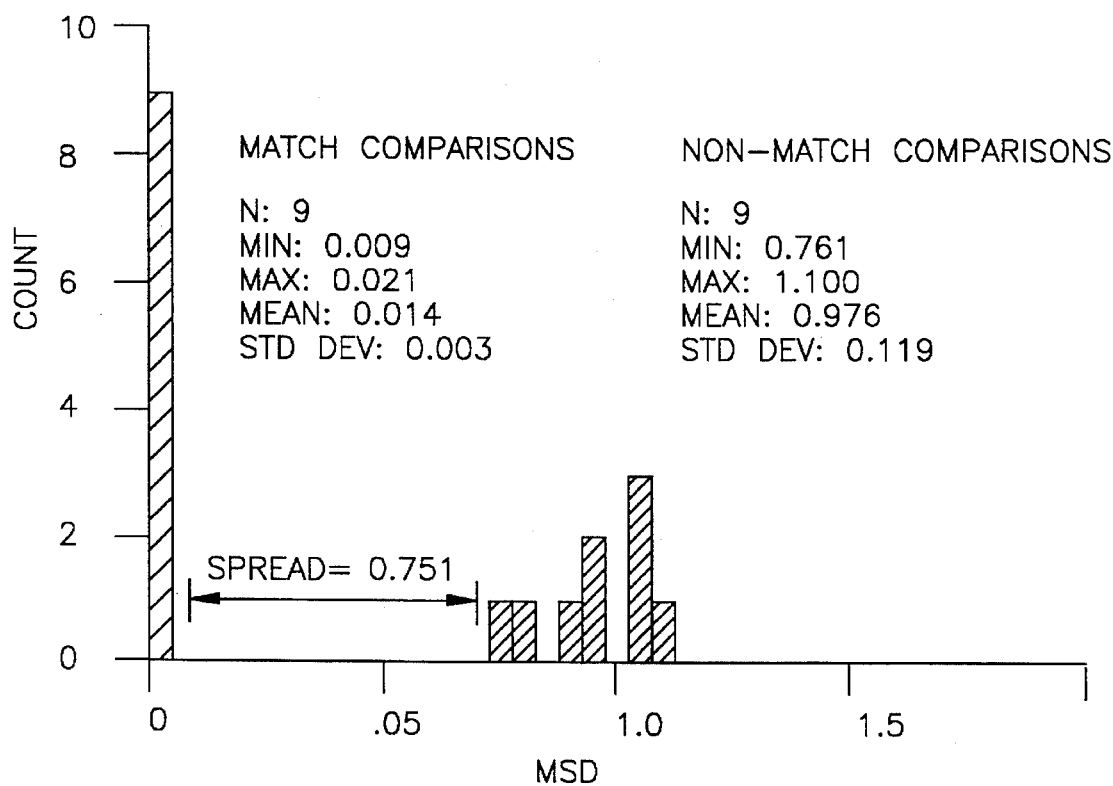
FIG. 7b is a match/non-match probability histogram for far-gate, multiple calibration scans of graphite-epoxy coupons.

For fiberglass-epoxy and graphite-epoxy coupons, far-gate scans were done with one set of scans common to a single calibration and a second set of scans calibrated prior to each scan. Results are shown in FIGS. 6a, and 6b for the fiberglass-epoxy coupons and in FIGS. 7a and 7b for the graphite-epoxy coupons using a gated peak amplitude value for image intensity. For the fiberglass-epoxy coupons, FIGS. 6a and 6b for common calibration and individual scan calibrations respectively, the figures show a significant difference in match and non-match distributions and the spread between them. For the graphite-epoxy coupons, FIGS. 7a and 7b for common calibration and individual scan calibrations respectively, the figures show no significant difference in either the distributions or spread between them. Additional testing showed that root-mean-square value decreased this variation and yielded performance which was not as dependent on material type. It is concluded that the calibration procedure is material type dependant for this process for fiberglass-epoxy composites. In addition, the calibration is a slight source of image variation. Further testing showed that substituting root-mean-square for peak amplitude in determination of image intensity decreased calibration variation and yielded performance that was less dependent upon material type.

EXAMPLE 3

Experiments were conducted to demonstrate operation of the interrogation/tag system using an aerospace aluminum test object.

The ultrasonic identifier, configured for metals interrogation, was repackaged in a laboratory then transported four miles to an aluminum test object, and reassembled for data acquisition by a team of two in a two-hour time span. Two data acquisition sites were selected on the test object. The data acquisition sites were located on a riveted panel that was assumed to be integral to the test object. Tape was applied near the two sites and pencil marks made on it as fiducial marks for reader positioning and alignment.

Six scans were acquired in approximately one hour; that is, data sets A1 through A3 from site A, and data sets B1 through B3 from site B. Between scans, the reader was removed and manually repositioned. The six replicate comparisons from sites A and B yielded Mean Squared Distances that were all less than or equal to 0.21. An exception was one scan having an MSD of 0.32. This indicated that data had been acquired correctly for five of the six scans. Comparisons between combinations of different material volumes yielded MSD values that were all higher than 0.83. Thus, good separation existed between the match and non-match cases.

It was confirmed that during the scan having an MSD of 0.32, the reader slipped during scan B2.

Repackaging took approximately one hour. The equipment was then transported back to the laboratory, reassembled and shown to be functional without incident that same day.

A conclusion is that data indicates that the metal ultrasonic identifier equipment is sufficiently robust to withstand local transportation and relatively easy to assemble, use, and repackage in a time span of approximately four hours. Successful signature acquisition from an aluminum structure, furthermore, shows that the metal equipment is able to acquire unique signatures from thin panels on aerospace objects.

Closure

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An apparatus for positive identification of a structural object having a bulk volume and at least one surface, comprising:

(a) an ultrasonic reader set on the surface and having at least one ultrasonic transducer for interrogating a first selected plane within the bulk volume by obtaining a first collection of ultrasonic reflections from a plurality of subsurface features on the first selected plane, said reader capable of obtaining a second collection of ultrasonic reflections from within the bulk volume, said ultrasonic transducer having a focus greater than the size of most of the plurality of said subsurface features;

(b) an electronic data handler for providing pulses to the ultrasonic reader and for collecting electronic signals from the ultrasonic reader and sending the electronic signals to;

(c) a central processing unit having a first set of instructions for scaling both the first and second collections of reflections to provide scaled image data wherein the first set of ultrasonic reflections results in an identification reference and the second set of ultrasonic reflections results in a new scan;

(d) storage for the identification reference and the new scan;

(e) said central processing unit having a second set of instructions for aligning the identification reference with the new scan;

(f) said central processing unit having a third set of instructions for comparing the identification reference to the new scan; and (g) a display permitting an observer to decide whether the identification reference and the new scan are the same or different.

2. The apparatus as recited in claim 1, wherein the electronic data handler comprises:

(a) a pulser having a high voltage supply connected to positive and negative DMOS field effect transistors for providing pulses to the ultrasonic transducer;

(b) a preamplifier for receiving and amplifying electronic signals from the ultrasonic transducer;

(c) an analog to digital converter for converting the electronic signal to a digital signal compatible with the central processing unit.

3. The apparatus as recited in claim 2, wherein the pulser further comprises:

(a) a speed-up circuit added to a gate side of each field effect transistor;

(b) shielding material placed over the field effect transistors and grounded to reduce noise from an adjacent computer;

(c) a resistor replacing a damping circuit within the pulser, again for the purpose of reducing noise from the computer; and (d) a capacitor added to the high voltage supply within the pulser for making a pulser wave output closer to an ideal square wave shape.

4. The apparatus as recited in claim 2, wherein the electronic data handler further comprises:

a time variable gain amplifier and interface circuit for connection to a computer and subsequent computer control of the time variable gain amplifier.

5. A method for positive identification of a structural object having a bulk volume and at least one surface, comprising the steps of:

(a) defining a identification reference by making a first selection of a first plane within a first bulk volume of the structural object, then interrogating the first plane by obtaining a first collection of ultrasonic reflections from a plurality of point locations on the first plane and scaling the first collection of reflections to provide image data;

(b) storing the image data as the identification reference;

(c) interrogating a second bulk volume by making a second selection of a second plane within the bulk volume and obtaining a second collection of ultrasonic reflections from a plurality of point locations on the second plane and providing image data as a new scan;

(d) said first and second collections of ultrasonic reflections produced from ultrasonic waves having a focus of greater size than a portion of subsurface features at a portion of the point locations within the structural object so that the image data produces an abstract image;

(e) scaling the image data of both reference and new scan;

(f) aligning the identification reference with the new scan;

(g) comparing the identification reference to the new scan; and (h) deciding whether the identification reference and the new scan are the same or different on the basis of the comparison.

6. The method as recited in claim 5, further comprising the step of filtering the image data of both reference and new scan prior to scaling.

7. An apparatus for positive identification of a structural object having a bulk volume and at least one surface, comprising:

(a) an ultrasonic reader set on the surface and having at least one ultrasonic transducer for collecting ultrasonic reflections and converting the reflections to electronic signals, said ultrasonic transducer having a focus greater than a size of most of a plurality of any subsurface features;

(b) an electronic data handler providing pulses to the ultrasonic transducer and collecting electronic signals from the ultrasonic transducer;

(c) a central processing unit receiving the electronic signals and having a first set of instructions for scaling the collections of electronic signals and producing an identification reference and a new scan;

(d) storage for the identification reference and the new scan;

(e) said central processing unit having a second set of instructions for aligning the identification reference with the new scan;

(f) said central processing unit having a third set of instructions for comparing the identification reference to the new scan; and (g) a display permitting an observer to decide whether the identification reference and the new scan are the same or different.

8. The apparatus as recited in claim 7, wherein the electronic data handler comprises:

(a) a pulser having a high voltage supply connected to positive and negative DMOS field effect transistors for providing pulses to the ultrasonic transducer;

(b) a preamplifier for receiving and amplifying electronic signals from the ultrasonic transducer;

(c) an analog to digital converter for converting the electronic signal to a digital signal compatible with the central processing unit.

9. The apparatus as recited in claim 8, wherein the pulser further comprises:
   (a) a speed-up circuit added to a gate side of each field effect transistor;
   (b) shielding material placed over the field effect transistors and grounded to reduce noise from an adjacent computer;
   (c) a resistor replacing a damping circuit within the pulser, again for the purpose of reducing noise from the computer; and
   (d) a capacitor added to the high voltage supply within the pulser for making a pulser wave output closer to an ideal square wave shape.

10. The apparatus as recited in claim 8, wherein the electronic data handler further comprises:
   a time variable gain amplifier and interface circuit for connection to a computer and subsequent computer control of the time variable gain amplifier.

11. An apparatus for positive identification of a structural object having a bulk volume and at least one surface, comprising:
   (a) an ultrasonic reader set on the surface and having at least one ultrasonic transducer for interrogating a first selected plane within the bulk volume by obtaining a first collection of ultrasonic reflections from a plurality of point locations on the first selected plane, said reader capable of obtaining a second collection of ultrasonic-reflections from within the bulk volume;
   (b) an electronic data handler for providing pulses to the ultrasonic reader and for collecting electronic signals from the ultrasonic reader, said electronic data handler comprising,
      (i) a pulser having a high voltage supply connected to positive and negative DMOS field effect transistors for providing pulses to the ultrasonic transducer;
      (ii) a preamplifier for receiving and amplifying electronic signals from the ultrasonic transducer;
      (iii) an analog to digital converter for converting the electronic signal to a digital signal compatible with a central processing unit,
      (iv) said electronic data handler sending the electronic signals to;
   (c) said central processing unit having a first set of instructions for scaling both the first and second collections of reflections to provide scaled image data wherein the first set of ultrasonic reflections results in an identification reference and the second set of ultrasonic reflections results in a new scan;
   (d) storage for the identification reference and the new scan;
   (e) said central processing unit having a second set of instructions for aligning the identification reference with the new scan;
   (f) said central processing unit having a third set of instructions for comparing the identification reference to the new scan; and
   (g) a display permitting an observer to decide whether the identification reference and the new scan are the same or different.

12. The apparatus as recited in claim 11, wherein the pulser further comprises:
   (a) a speed-up circuit added to a gate side of each field effect transistor;
   (b) shielding material placed over the field effect transistors and grounded to reduce noise from an adjacent computer;
   (c) a resistor replacing a damping circuit within the pulser, again for the purpose of reducing noise from the computer; and
   (d) a capacitor added to the high voltage supply within the pulser for making a pulser wave output closer to an ideal square wave shape.

13. The apparatus as recited in claim 11, wherein the electronic data handler further comprises:
   a time variable gain amplifier and interface circuit for connection to a computer and subsequent computer control of the time variable gain amplifier.

14. An apparatus for positive identification of a structural object having a bulk volume and at least one surface, comprising:
   (a) an ultrasonic reader set on the surface and having at least one ultrasonic transducer for collecting ultrasonic reflections and converting the reflections to electronic signals;
   (b) an electronic data handler providing pulses to the ultrasonic transducer and collecting electronic signals from the ultrasonic transducer, comprising,
      (i) a pulser having a high voltage supply connected to positive and negative DMOS field effect transistors for providing pulses to the ultrasonic transducer;
      (ii) a preamplifier for receiving and amplifying the electronic signals from the ultrasonic transducer;
      (iii) an analog to digital converter for converting the electronic signal to a digital signal compatible with a central processing unit,
      (iv) said electronic handler sending the electronic signals to said central processing unit;
   (c) said central processing unit receiving the electronic signals and having a first set of instructions for scaling the collections of electronic signals and producing an identification reference and a new scan;
   (d) storage for the identification reference and a new scan;
   (e) said central processing unit having a second set of instructions for aligning the identification reference with the new scan;
   (f) said central processing unit having a third set of instructions for comparing the identification reference to the new scan; and
   (g) a display permitting an observer to decide whether the identification reference and the new scan are the same or different.

15. The apparatus as recited in claim 14, wherein the pulser further comprises:
   (a) a speed-up circuit added to a gate side of each field effect transistor;
   (b) shielding material placed over the field effect transistors and grounded to reduce noise from an adjacent computer;
   (c) a resistor replacing a damping circuit within the pulser, again for the purpose of reducing noise from the computer; and
   (d) a capacitor added to the high voltage supply within the pulser for making a pulser wave output closer to an ideal square wave shape.

16. The apparatus as recited in claim 14, wherein the electronic data handler further comprises:
   a time variable gain amplifier and interface circuit for connection to a computer and subsequent computer control of the time variable gain amplifier.

* * * * *